US005482153A

United States Patent [19]

Abraham et al.

[11] Patent Number: 5,482,153

[45] Date of Patent: Jan. 9, 1996

[54] OPERATION PANEL FOR A PASSENGER CONVEYING DEVICE

[75] Inventors: Detlev Abraham; Hans-Dietrich Riedel, both of Berlin, Germany

[73] Assignee: Otis Elevator Company, Farmington, Conn.

[21] Appl. No.: 280,037

[22] Filed: Jul. 25, 1994

[51] Int. Cl.[6] .................... B65G 43/00

[52] U.S. Cl. .................... 198/322; 198/323

[58] Field of Search .................... 198/322, 326, 198/331, 323, 324

[56] References Cited

U.S. PATENT DOCUMENTS

| | | | |
|---|---|---|---|
| 3,580,376 | 5/1971 | Lashbough | 198/322 |
| 4,711,335 | 12/1987 | Watanabe | 198/324 |
| 4,798,274 | 1/1989 | Saito | 198/324 |
| 5,040,659 | 8/1991 | Saito et al. | 198/324 |
| 5,178,254 | 1/1993 | Saito et al. | 198/323 |
| 5,186,300 | 2/1993 | Zaharia | 198/322 |

FOREIGN PATENT DOCUMENTS

| | | | |
|---|---|---|---|
| 87160269 | 3/1988 | Germany . | |
| 53-91282 | 10/1978 | Japan . | |
| 1-294193 | 11/1989 | Japan . | |
| 2-123091 | 5/1990 | Japan . | |
| 2-127390 | 5/1990 | Japan . | |
| 2-282189 | 11/1990 | Japan . | |
| 5201682 | 8/1993 | Japan | 198/322 |
| 6-32582 | 6/1994 | Japan . | |

OTHER PUBLICATIONS

"An Outdoor Escalator with Remote Supervision and Control" from Mitsubishi Electric Advance, vol. 6, Dec. 1978, pp. 21–23.

*Primary Examiner*—James R. Bidwell

[57] ABSTRACT

An operation panel for a passenger conveying device having a balustrade is provided comprising a key switch, a key pad, and a processor. The key switch may be actuated into a plurality of switch positions by an independent key and the keypad may be used to input data into the processor. The processor, which processes data from external inputs and the keypad, includes a programmable memory selectively accessible by password. A first level of the processor is accessible without actuating the key switch from a first switch position or entering a password into the keypad. A second level of the processor is accessible by actuating the key switch into a second switch position. A third level of the processor is accessible by actuating the key switch into the second switch position and inputting a password to the processor through the keypad.

24 Claims, 3 Drawing Sheets

OPERATION PANEL FOR A PASSENGER CONVEYING DEVICE

BACKGROUND OF THE INVENTION

1. Technical Field

This invention pertains to passenger conveyors in general, and to operation panels for passenger conveying devices in particular.

2. Background Information

Escalators, moving walkways and other passenger conveying devices efficiently move a large volume of pedestrian traffic from one point to another. Passengers step on moving steps (or belts, or pallets) and are transported along at a constant rate of speed. For safety reasons, passenger handrails are provided, traveling in the same direction and speed as the steps. A balustrade assembly supports and guides one of the handrails on each side of the steps.

Each balustrade assembly includes a plurality of balustrade panels (typically glass) which extend up from a base to support the handrail. The base consists of a number of external enclosure panels including an outer decking, an inner profile, and a skin panel. The outer decking encloses the mechanics on the side of the balustrade panel opposite the moving steps. The inner decking and skin panel enclose the mechanics adjacent the moving steps.

The moving steps are driven about a circuitous path by a drive machine located, in the case of an escalator, in the upper landing The drive machine is controlled by a machine controller also located in the upper landing. In most cases the machine controller electrically connects the drive machine, the safety switches, and the controls. Servicing the escalator, therefore, requires that the upper landing be disassembled and the processor removed. A person of skill in the an will recognize that removing the processor is an ergonomically difficult task and a time consuming one as well.

Passenger conveying devices today include many options designed to customize the device to the application. For example, escalators located in department stores often include lighting fixtures to illuminate the device, to advertise, and to convey information. Escalators in department stores also often include controls to reverse direction. The flow of traffic within a department store can often be controlled by strategically positioning the escalators, and the displays in the vicinity of escalator landings. Reversible escalators give store owners another tool for such purposes.

DISCLOSURE OF THE INVENTION

It is, therefore, an object of the present invention to provide an operation panel that facilitates the service of a passenger conveying device.

It is a further object of the present invention to provide an operation panel that facilitates the operation of a passenger conveying device.

It is a still further object of the present invention to provide an operation panel that reduces the time necessary to service and operate a passenger conveying device.

It is a still further object of the present invention to provide an operation panel for a passenger conveying device that selectively limits access to different functions and aspects of the passenger conveying device.

It is a still further object of the present invention to provide an operation panel for a passenger conveying device mounted in a balustrade base panel, thereby providing ready access to the operation panel.

According to the present invention, an operation panel for a passenger conveying device having a balustrade is provided comprising a key switch, a key pad, and a processor. The key switch may be actuated into a plurality of switch positions by an independent key and the keypad may be used to input data into the processor. The processor, which processes data from external inputs and the keypad, includes a programmable memory selectively accessible by password. A first level of the processor is accessible without actuating the key switch from a first switch position or entering a password into the keypad. A second level of the processor is accessible by actuating the key switch into a second switch position. A third level of the processor is accessible by actuating the key switch into the second switch position and inputting a password to the processor through the keypad.

According to one aspect of the present invention, the operation panel is mounted in the inner decking of a balustrade base.

According to another aspect of the present invention, the processor is programmed to receive service data from the external inputs and store it in the third level of the processor, thereby allowing access to the service information only by the use of a key and a password.

According to still another aspect of the present invention, a plurality of options may be switched on or off by a user through the key pad when the processor is switched into the second level by actuating the key switch.

According to still another aspect of the present invention, the operation panel includes a display for displaying data.

According to still another aspect of the present invention, the data may be displayed in a variety of languages.

According to still another aspect of the present invention, the operation panel includes a means for counting passengers.

According to still another aspect or the present invention, the operation panel includes a emergency stop switch, which may be actuated to stop the passenger conveying device in the event of an emergency.

An advantage of the present invention is that it greatly facilitates service. The third level of the processor receives and stores service data from the various external inputs throughout the passenger conveying device including, but not limited to, inputs from combplate safety switches, handrail speed monitoring devices, step monitoring devices, skirt panel deflection safety switches, total time of operation, number of machine starts, etc.. The processor stores this data in an organized fashion which can easily be accessed through the operation panel mounted in the inner decking of the balustrade.

Another advantage of the present invention is that the processor possesses a plurality of different levels of access. A device having different levels of access permits access to be tailored such that the dissemination of information is tailored to certain groups of people.

Another advantage of the present invention is that the operation panel minimizes the need to access the machine controller for service reasons. Specifically, the third level of the processor stores service information that can assist the mechanic in determining whether a problem exists without having to disassemble the landing and pull the machine controller up.

Another advantage of the present invention is that all of the features of the operation panel are provided in an aesthetically pleasing package mounted in the inner decking of the balustrade. A person of ordinary skill in the art will recognize that an aesthetically pleasing passenger conveying device is highly desirable.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
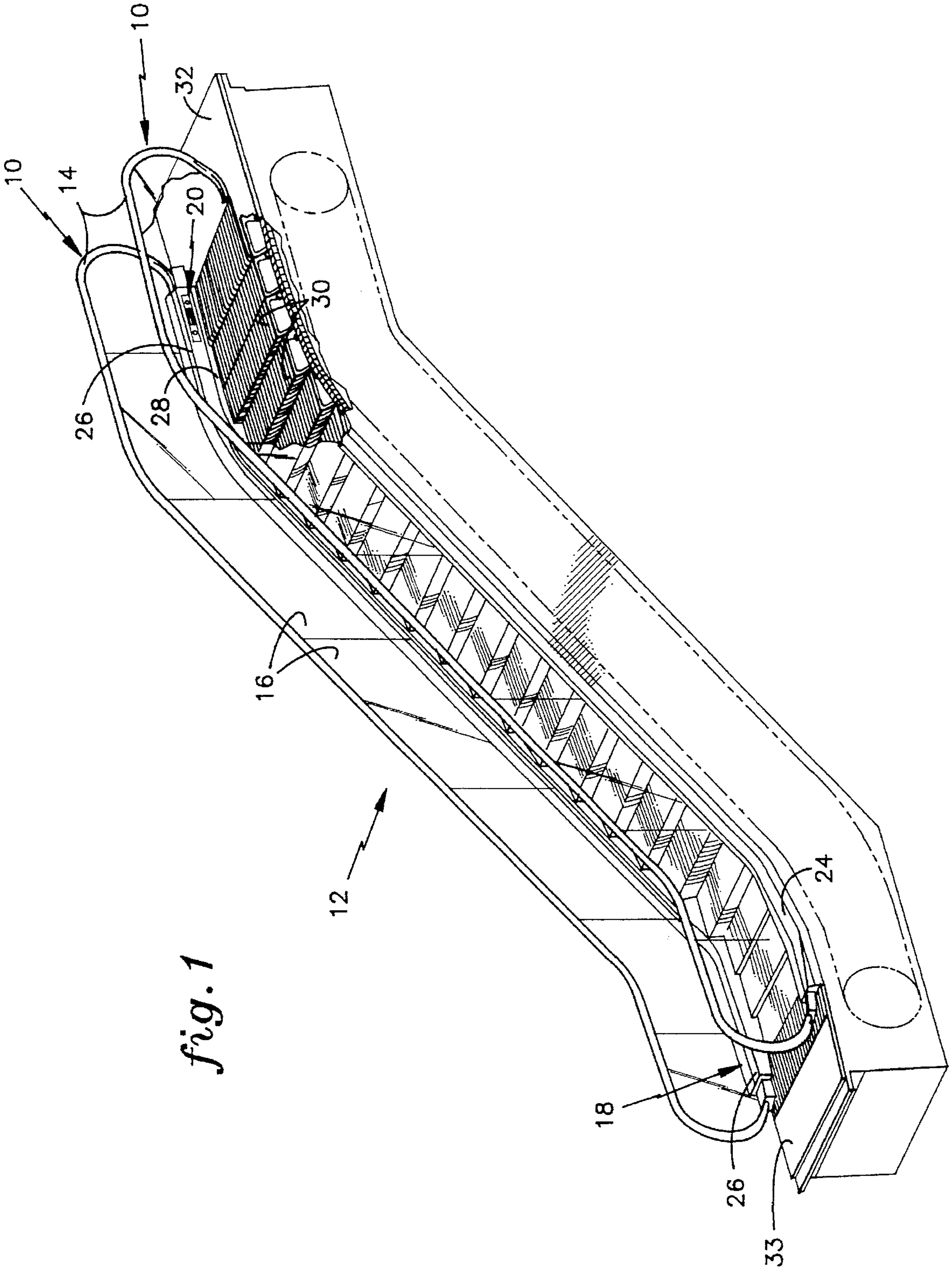
FIG. 1 shows a diagrammatic view of an escalator having an operation panel.

Referring to FIG. 1, a balustrade 10 for an escalator 12 includes a handrail 14, balustrade panels 16, a base 18, and an operation panel 20. The handrail 14 travels a circuitous path from one end of the escalator 12 to the other end, as is known in the art. The balustrade panels 16 extend up from the base 18 to support and guide the handrail 14 in the exposed portion of the handrail path.

Referring to FIGS. 1 and 9 the base 18 includes a plurality of enclosure panels including an outer decking 24 (FIG. 1 ), an inner decking 26, and a skirt panel 28. The outer decking 24 encloses the mechanics on the side of the balustrade panels 16 opposite the moving steps 30 (or treadplates, or pallets, etc., in the case of a passenger conveyor other than an escalator). The inner decking 26 and skirt panel 28 enclose the mechanics adjacent the moving steps 30. The balustrades 10 may include a plurality of different lighting options (not shown) including, but not limited to, under handrail lighting, lighting within the balustrade panels, and skirt panel/inner decking lighting. The escalator 12 may also have switching devices the intermittent or continuous operation.

Figure 2:
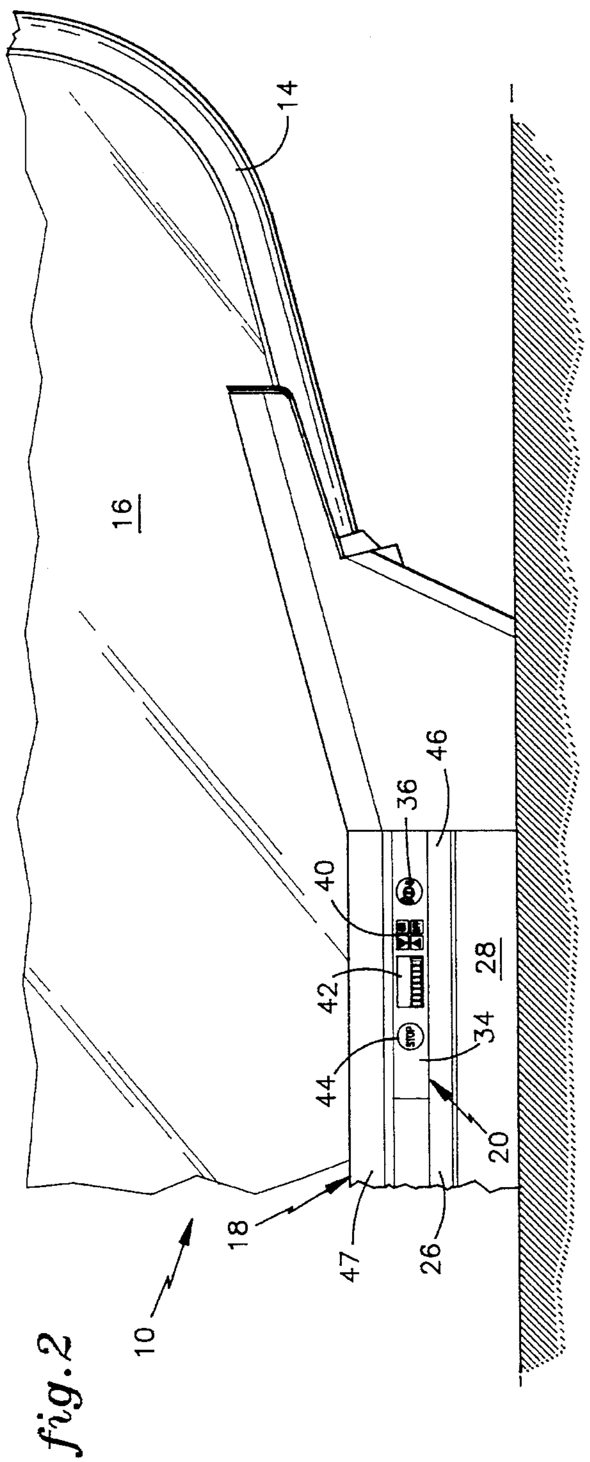
FIG. 2 is a sectional diagrammatic view of a landing of an passenger conveying device.
Figure 3:
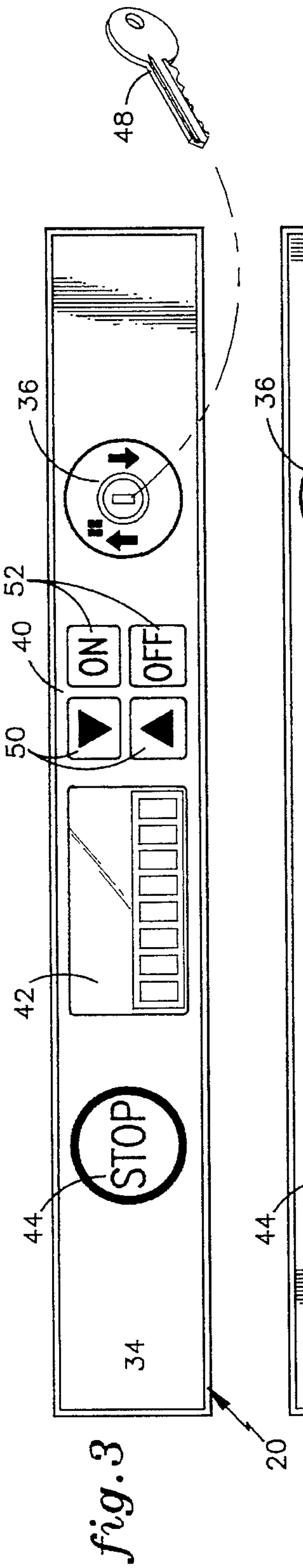
FIG. 3 is a front view of a first operation panel.
Figure 4:
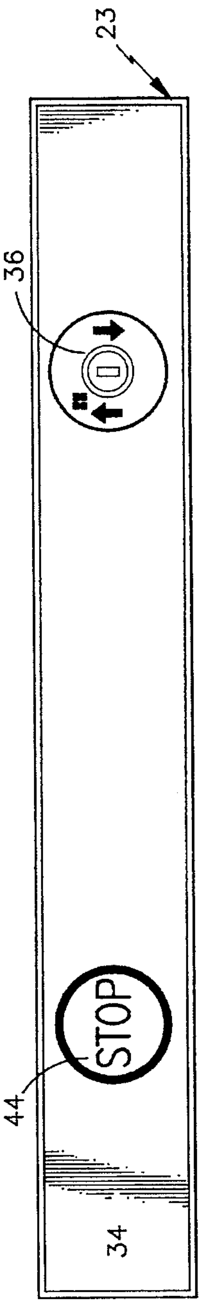
FIG. 4 is a front view of a second operation panel.

Referring to FIGS. 2 and 3, in one of the landings 32 (see FIG. 1) an operation panel 20 is mounted in the inner decking 26 of the balustrade base 18. The operation panel 20 includes a housing (not shown) a face plate 34, a key switch 36, a processor 38 (see FIG. 5), a key pad 40, a display 42, and an emergency stop button 44. FIG. 2 shows the operation panel 20 mounted such that the face plate 34 is flush with a vertical of the inner decking 26. Alternatively, the operation panel 20 may also be mounted on the angled surface 47 of the inner decking 26 or in the skin panel 28. A second operation panel 23 (not shown in FIG. 1) may be mounted in the other landing 33 having only a key switch 36 and an emergency stop button 44, as is shown in FIG. 4

Figure 5:
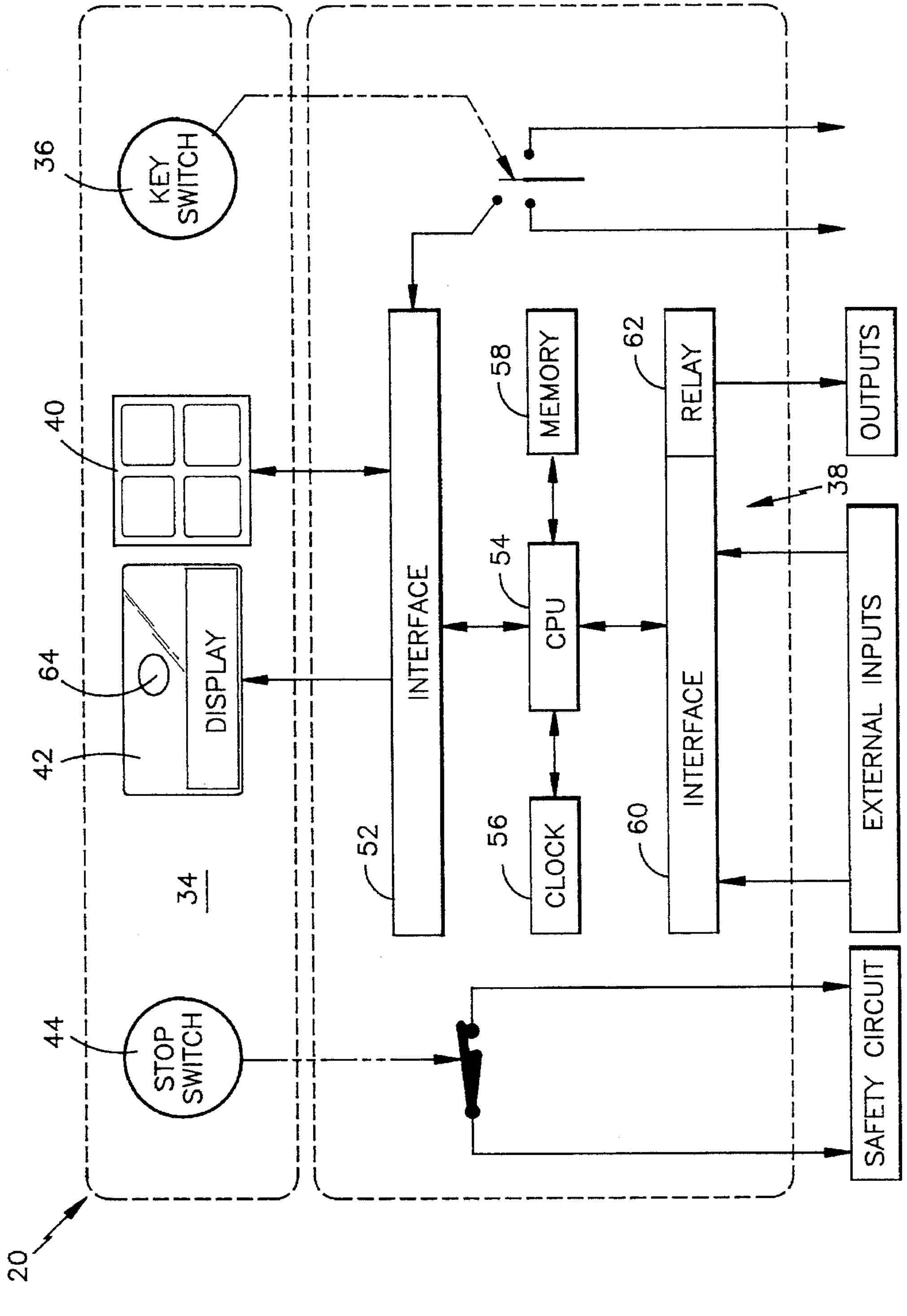
FIG. 5 is a schematic view of the operation panel shown in FIG. 3, including the internal electrical hardware.

The key switch 36, key pad 40, display 42, and emergency stop button 44 are mounted on the face plate 34, as is shown in FIG. 3. The key switch 36 includes a removable, independent key 48. Inserting the key 48 and rotating the key 48 enables the key switch 36 to be actuated into a plurality of switch positions other than the non-actuated first position. The key pad 40 includes up and down arrow buttons 50 and on and off 52 buttons for inputting data to the processor 38 (FIG. 5). The display 42 shows the information as it is input into the processor 38 (FIG. 5) through the key pad, in addition to showing data originating from external inputs, as will be discussed infra. The emergency stop button 44 is directly wired to the escalator drive. Depressing the button 44 breaks the normally closed circuit and thereby stops the current flow to the drive motor and causes the brakes to actuate.

FIG. 5 shows the operation panel 20 in a schematic view to better illustrate the relationship between those elements mounted in the face plate 34 and the electronic elements of the processor 38. The processor 38, which is mounted within the operation panel 20 behind the face plate 34, comprises a first interface 52, a central processing unit (CPU) 54, a clock 56, a memory 58, a second interface 60, and at least one relay 62 attached to the second interface 60. The first interface 52 connects the key pad 40 and the display 42 to one another and to the CPU 54. The clock 56 and the memory 58 are peripherally attached to the CPU 54 and interact therewith. The memory 58 includes an auxiliary power source (not shown) to prevent stored information from being erased in the event power is cut to the CPU 54. The second interface 60 is also attached to the CPU 54. Data from the various external inputs including, but not limited to, combplate safety switches, handrail speed monitoring devices, step monitoring devices, skirt panel deflection safety switches, present status of the escalator drive, direction of travel, intermittent or continuous operation, etc., enters the CPU 54 through the second interface 60. Data input through the key pad 40 such as an instruction to start the drive motor, in a particular direction of travel, etc., are transferred through the CPU 54 and out the relay 62 attached to the second interface 60.

A passenger counter 64 may also be mounted in the face plate 34 of the operation panel 20. In the preferred embodiment, the passenger counter 64 comprises a photoelectric proximity sensor mounted within the display 42. The photoelectric proximity sensor includes a transmitter for sending out a signal, and a receiver for receiving any signal reflected off an object which enters the signal's path. A person of skill in the art will recognize that there are a variety of different sensors that may be used alternatively In a first mode of operation of the escalator 12, the key switch 36 is in a first non-actuated position and the processor 38 is in a first level of access. In this level, the display 42 may or may not display information, and options may be turned on or shut off, depending on instructions previously input into the CPU 54. If information is displayed, it may be of a variety of types including a warning the only authorized personnel may activate the escalator 12, or who to contact for service, etc. Moreover, any information may be displayed in a variety of languages all of which are stored in the memory 58 attached to the CPU 54. A person of skill will recognize the great advantage this possesses in an international market.

When an authorized person with a key 48 inserts the key 48 and rotates the key switch 36 to a second switch position, the processor 38 is enabled into a second level and the key pad 40 may be used to input instructions into the CPU 54. For instance, in the second level a user may instruct any or all of the lighting associated with the escalator 12 to be turned on or off and the machine controller may be instructed to start the steps 30 in a particular direction, or stop them. All, or some, of the options may be accessible in this level depending upon the programming of the CPU 54.

To access the third level of the processor 38, the user must insert the key 48 and rotate the key switch 36 into the second switch position and then input a predetermined password into CPU 54 via the key pad 40. Once both requirements have been met, then the processor 38 may be accessed for service information such as, but not limited to, where a limit signal is coming from, when did it occur, how frequently has it occurred over a period of time, etc. Other service information such as the number of hours of operation or the number of stags over a period of time may also be accessed in this level. The exact configuration of what information is available at this level versus the other levels may be programmed into the CPU 54.

Although this invention has been shown and described with respect to the detailed embodiments thereof, it will be understood by those skilled in the art that various changes in form and detail thereof may be made without departing from the spirit and scope of the claimed invention. For example, the use of the password and the key switch 36 to differentiate the levels of access within the processor 38 may be reversed or complimented with other similar methods. For example, a fourth level of the processor 38 may be accessed by the use of a second password, etc.

We claim:

1. An operation panel for a passenger conveying device having a balustrade, comprising:

a key switch, which may be actuated into a plurality of switch positions by an independent key;

a keypad, for inputting data;

a processor, for processing data from external inputs and from said keypad, said processor having a programmable memory selectively accessible by password;

wherein a first level of said processor is accessible without actuating said key switch from a first switch position or entering a password into said keypad;

wherein a second level of said processor is accessible by actuating said key switch into a second switch position; and wherein a third level of said processor is accessible by actuating said key switch into said second switch position and inputting a password to said processor through said keypad.

2. An operation panel for a passenger conveying device according to claim 1, wherein said operation panel is mounted in a readily accessible position in a base panel of the balustrade.

3. An operation panel for a passenger conveying device according to claim 2, wherein said processor is a microprocessor programmed to receive and store service data from said external inputs in said third level of said processor, thereby allowing access to said service information only by the use of said key and said password.

4. An operation panel for a passenger conveying device according to claim 3, wherein said external inputs for generating service data comprise:

means for measuring the braking distance of the passenger conveying device;

a plurality of safety switches;

means for recording the operation time of the passenger conveying device; and means for recording the number of starts of said passenger conveying device.

5. An operation panel for a passenger conveying device according to claim 4, wherein in said second level of said processor, a plurality of options may be selectively switched on or off by a user inputting data through said keypad.

6. An operation panel for a passenger conveying device according to claim 5, further comprising:

a display, for displaying data;

wherein data dispatched from said processor to said display can be shown on said display in a plurality of languages.

7. An operation panel for a passenger conveying device according to claim 6, further comprising:

a means for counting passengers riding on said passenger conveying device.

8. An operation panel for a passenger conveying device according to claim 7, further comprising:

an emergency stop switch, said switch electrically connected to a drive means for the passenger conveying device said such actuating said switch causes said passenger conveying device to stop operating.

9. An operation panel for a passenger conveying device according to claim 1, further comprising:

a display, for displaying data;

wherein data dispatched from said processor to said display can be shown on said display in a plurality of languages.

10. An operation panel for a passenger conveying device having a balustrade, comprising:

a key switch, which may be actuated into a plurality of switch positions by an independent key;

a keypad, for inputting data, wherein said keypad is operational only when said key switch is in a predetermined one of said switch positions;

a processor, for processing data from external inputs and from said keypad, said processor having a programmable memory selectively accessible by password; and a display, for displaying data dispatched from said processor.

11. An operation panel for a passenger conveying device according to claim 10, wherein said operation panel mounts in a readily accessible position in a base panel of the balustrade.

12. An operation panel for a passenger conveying device according to claim 11, wherein said processor is programmed to accept and store service data from said external inputs, and wherein said service information is only accessible by the use of said key and said password.

13. An operation panel for a passenger conveying device according to claim 12, wherein said external inputs for generating service data comprise:

means for measuring the braking distance of the passenger conveying device;

a plurality of safety switches;

means for recording the operation time of the passenger conveying device; and means for recording the number of starts of said passenger conveying device.

14. An operation panel for a passenger conveying device according to claim 13, wherein in said second level of access, a plurality of options may be selectively switched on or off by a user inputting data through said keypad.

15. An operation panel for a passenger conveying device according to claim 14, wherein data dispatched from said processor to said display can be shown on said display in a plurality of languages.

16. An operation panel for a passenger conveying device according to claim 15, further comprising:

a means for counting passengers riding on said passenger conveying device.

17. An operation panel for a passenger conveying device according to claim 16, further comprising:

an emergency stop switch, said switch electrically connected to a drive means for the passenger conveying device said such actuating said switch causes said passenger conveying device to stop operating.

18. A balustrade for a passenger conveying device, comprising:

a handrail;

a plurality of balustrade panels for supporting said handrail;

a base, including an inner decking, a skirt panel attached to said inner decking, and an outer decking, said outer decking positioned on the opposite side of said balustrade panels as said inner decking; and a operation panel, mounted in said inner decking, said operation panel including:

a key switch, which may be actuated into a plurality of switch positions by an independent key;

a keypad, for inputting data;

a processor, for processing data from external inputs and from said keypad, said processor having a programmable memory selectively accessible by password;

wherein a first level of said processor is accessible without actuating said key switch from a first switch position or entering a password into said keypad;

wherein a second level of said processor is accessible by actuating said key switch into a second switch position; and wherein a third level of said processor is accessible by actuating said key switch into said second switch position and inputting a password to said processor through said keypad.

19. A balustrade according to claim 18, wherein said processor is programmed to accept and store service data from said external inputs in said third level of said processor, thereby allowing access to said service information only by the use of said key and said password.

20. A balustrade according to claim 19, wherein said external inputs for generating service data comprise:

means for measuring the braking distance of the passenger conveying device;

a plurality of safety switches;

means for recording the operation time of the passenger conveying device; and means for recording the number of starts of said passenger conveying device.

21. A balustrade according to claim 20, wherein in said second level of said processor, a plurality of options may be selectively switched on or off by a user inputting data through said keypad.

22. A balustrade according to claim 21, wherein said operation further comprises:

a display, for displaying data;

wherein data dispatched from said processor to said display can be shown on said display in a plurality of languages.

23. A balustrade according to claim 22, wherein said operation further comprises:

a means for counting passengers riding on said passenger conveying device.

24. A balustrade according to claim 23, wherein said operation further comprises:

an emergency stop switch, said switch electrically connected to a drive means for the passenger conveying device said such actuating said switch causes said passenger conveying device to stop operating.

* * * * *